United States Patent
Kunkel et al.

[11] Patent Number: 5,836,543
[45] Date of Patent: Nov. 17, 1998

[54] DISCUS-SHAPED AERODYNE VEHICLE FOR EXTREMELY HIGH VELOCITIES

[75] Inventors: Klaus Kunkel, Herbartstrasse 6A, D-40882, Ratingen; Peter Plichta, Düsseldorf, both of Germany

[73] Assignee: Klaus Kunkel, Ratingen, Germany

[21] Appl. No.: 666,581

[22] PCT Filed: Oct. 16, 1995

[86] PCT No.: PCT/DE95/01430

§ 371 Date: Aug. 1, 1996

§ 102(e) Date: Aug. 1, 1996

[87] PCT Pub. No.: WO96/14504

PCT Pub. Date: May 17, 1996

[30] Foreign Application Priority Data

Nov. 2, 1994 [DE] Germany .......................... 44 39 073.4

[51] Int. Cl.⁶ .............................. B64C 15/12; B64C 30/00
[52] U.S. Cl. ...................... 244/12.2; 244/12.3; 244/12.4; 244/23 B; 244/23 C
[58] Field of Search ............................... 244/6, 7 R, 12.1, 244/12.2, 12.3, 12.4, 23 B, 23 C, 74; 60/39.461, 205

[56] References Cited

U.S. PATENT DOCUMENTS

| | | | |
|---|---|---|---|
| 2,939,648 | 6/1960 | Fleissner | 244/74 X |
| 3,020,003 | 2/1962 | Frost et al. | 244/23 C X |
| 3,132,827 | 5/1964 | Roy et al. | 244/74 |
| 3,336,753 | 8/1967 | Mullen, II . | |
| 3,503,573 | 3/1970 | Modesti | 244/12.2 X |
| 5,039,031 | 8/1991 | Valverde | 244/12.3 X |
| 5,064,143 | 11/1991 | Bucher | 244/12.3 X |

FOREIGN PATENT DOCUMENTS

| | | |
|---|---|---|
| 4215835 | 12/1993 | Germany . |
| 2147052 | 5/1985 | United Kingdom . |

OTHER PUBLICATIONS

DATABASE WPI, Derwent Publications Ltd., London, GB, AN, 85–108095 & JP, A, 60 052 578.
Chemical Abstracts, vol. 119, No. 20, Abstract No. 206577c, Nov. 1993.
Journal of the American Ceramic Society, Bd. 69, Nr. 4, ISSN 0002–7820, C60–C61, Apr. 1986.
Journal of Spacecraft and Rockets, Bd. 19, Nr. 4, 294–306.

*Primary Examiner*—William Grant
*Attorney, Agent, or Firm*—Herbert Dubno

[57] ABSTRACT

A discus-shaped aircraft is provided with a peripheral jet arrangement for generating lift and, in the bottom of the aircraft, at least one rocket engine supplied with silicon hydride and compressed air and operated under conditions in which the silicon hydride is reacted with nitrogen of the compressed air to form silicon nitride while the nitrogen of the silicon hydride compounds reacts with oxygen to form $H_2O$.

14 Claims, 2 Drawing Sheets

DISCUS-SHAPED AERODYNE VEHICLE FOR EXTREMELY HIGH VELOCITIES

CROSS REFERENCE TO RELATED APPLICATIONS

This application is a national stage of PCT/DE95/01430 filed 16 Oct. 1995 and based, in turn, on German national application P4439073.4 of 2 Nov. 1994 under the International Convention.

FIELD OF THE INVENTION

The present invention relates to a discus-shaped aerodyne for extremely high velocities and extreme altitudes, the aerodyne having an outer casing generating buoyancy when horizontally flying through a gas atmosphere, a jet arrangement located in a peripheral region of the aerodyne and serving for the generation of a vertical movement and at least one rocket engine for the combustion of silicon hydride compounds for the generation of a horizontal movement of the aerodyne.

BACKGROUND OF THE INVENTION

In order to fly long distances, long-distance aircraft flying in the supersonic range must travel for a long time. Supersonic aircrafts with a very high fuel consumption, as for instance the Concorde, must have intermediate stops to supplement their fuel stock. Accordingly, there is a need for a long-distance aircraft which can be economically operated and with which a great number of passengers or a large quantity of freight can be transported.

An aerodyne of the above-described kind which is designed as spacecraft is known from German patent 42 15 835. The known aerodyne has three drive means. In the start phase it operates as a helicopter by using jets acting on two oppositely driven rings through gear means. The rings have adjustable blades and operate as turbine blade rings. The aerodyne is kept in suspension by this drive.

In this phase the aerodyne is accelerated by means of at least one rocket drive adapted to be swung out from a bottom area of the discus-shaped outer casing and oriented laterally obliquely. When this second drive is effective the helicopter drive can be switched off and the casing of the turbine blade rings can be pulled in so that the aerodyne is occluded with respect to the outside air. The aerodyne is adapted to be lifted to the upper level of the stratosphere with this rocket drive.

Furthermore, the known aerodyne includes at least one main thruster centrally located with respect to the discus-shaped outer casing and adapted to move the spacecraft through the vacuum space.

The main thruster and the rocket drive are formed in such a manner that they can be driven by a silane oil of the chemical formula $Si_5H_{12}$ to $Si_9H_{20}$ as rocket propellant.

In the cited publication (see U.S. Pat. No. 5,730,390 based on application Ser. No. 08/353,355) liquid oxygen is mentioned as oxidizing agent for the combustion of the silane oils in the two rocket engines, namely the rocket drive and the main thruster, wherein liquid chlorine or fluorine are also cited. This liquid oxidizing agent has to be carried along within the aerodyne. However, this fact practically excludes the use of such an aerodyne for aviation and makes the same only suited as spacecraft, as has also been described in German patent 42 15 835. That is, the large amount of oxidizing agents carried along does not make such aerodynes suitable for the transport of freight or passengers for long-distance flights.

OBJECT OF THE INVENTION

It is the object of the invention to provide an aerodyne of the cited kind which is suitable for flights within the terrestric area with a high load capacity and especially high velocities.

SUMMARY OF THE INVENTION

This object is attained in a discus-shaped aerodyne, according to the invention by providing at least one rocket drive in the form of a nitrogen burner in which the silicon hydride compounds are burned with atmospheric nitrogen at high temperatures in the presence of atmospheric oxygen as oxidizing agent for the hydrogen of the silicon hydride compounds.

Preferably, silane oils, having the chemical formula $Si_5H_{12}$ to $Si_9H_{20}$, are burned in the nitrogen burner.

Accordingly, with the inventive solution the rocket drive providing for the horizontal movement of the discus-shaped aerodyne is formed as a nitrogen burner in which the silicon hydride compounds, especially silane oils, are burned together with the nitrogen of the atmosphere. This has the advantage that the aerodyne need not carry along a special oxydizing agent, as for instance liquid oxygen, for the silicon hydride compounds since the atmosphere of the earth contains nitrogen ($N_2$) in a proportion of about 80%. Accordingly, air, especially compressed air, is introduced into the combustion chamber of the rocket drive and is caused to be reacted with the silicon hydride compounds.

When burning silicon hydride compounds, especially silane oils, with compressed air the oxygen portion reacts with the hydrogen of the silane chain in accordance with the equation $$4H+O_2=2H_2O.$$

In this hydrogen-oxygen-combustion, temperatures of about 3000° C. are reached. This temperature is sufficient to crack the $N_2$ molecules which are present in the supply of the compressed air. According to the equation $$4N+3Si=Si_3N_4$$

the nitrogen radicals now attack the free silicon atoms with extreme vehemence. Silicon nitride is formed which has a molecular weight of 117 and thus is nearly three times as heavy as carbon dioxide. Accordingly, the repulsion effect is significant as compared with earlier systems.

Of course, the cited reaction occurs only with correspondingly high temperatures. In the air silane oils, after ignition, burn only to develop red-brown amorphous silicon monoxide since the combustion mixture does not contain enough oxygen because of the rapidity of the combustion. No reaction with nitrogen takes place since nitrogen does not form free radicals under these conditions.

Compared with conventional jets which can only use about 20% of the atmosphere for the combustion, important advantages are obtained since the combustion can be based not only on the 20% of the atmosphere representing the $O_2$ content but also on the additional about 80% $N_2$ content. The silicon nitride ($Si_3N_4$), predominantly formed by the reaction of radicals with silicon, has a substantially higher molecular weight than the carbon dioxide developing with the jets of the prior art, whereby an especially high efficiency of the drive means is reached since, according to the kinetic energy equation, not only the velocity but also the mass of the gases is of importance.

According to a feature of the invention, in addition to air, nitrogen compounds or nitrogen-oxygen compounds are introduced into the combustion chamber. This is especially advantageous if in great altitudes (with decreasing density of the atmosphere) an effective nitrogen combustion or hydrogen combustion is to be maintained. Preferably, such compounds are introduced which contain not only nitrogen but also oxygen in order to ensure both reactions, these compounds can be $N_2O_4$ or nitric acid $HNO_3$. Furthermore, the invention does not exclude that nitrogen itself or corresponding oxidizing agents are carried along within the aerodyne in order to initiate or maintain the corresponding reactions. However, preferably, the nitrogen and oxygen of the air are used.

Preferably, the reaction is caused to run at a temperature above 1400° C. since below this value a combustion of the silicon hydride compounds, especially of the silane oils, with nitrogen can be realized only in a difficult manner or not at all. Preferably, one operates with increased temperatures of 2500°–3000° C. which are generated during the hydrogen-oxygen combustion resulting from the reaction of the oxygen portion of the atmosphere of the earth with the hydrogen portion of the silane chains of the silicon hydride compounds.

Accordingly, compared with the prior art the inventive aerodyne has, in addition to a jet arrangement serving for the generation of a vertical movement of the aerodyne, i.e. for the start and landing, only one rocket drive unit comprising at least one rocket engine formed as nitrogen burner. The previously described main thruster with the above-cited prior art is omitted since the inventive aerodyne is formed as true aerodyne for the terrestrial area, i.e. for the range of the atmosphere of the earth, and does not represent a spacecraft. The rocket drive unit including the at least one rocket engine provides for the principal movement (horizontal movement) of the aerodyne, wherein an especially high efficiency of the drive means can be achieved (high accelerations, high velocities and high payloads of the aerodyne with comparable low consumption of energy since the nitrogen required for the combustion can be taken from the air of the atmosphere) with the combustion of the silicon hydride compounds, especially silane oils, with nitrogen according to the invention. Furthermore, the aerodyne is especially compatible with regard to environmental aspects since silicon nitride is generated by the combustion of the silicon hydride compounds (silane oils) with nitrogen and has a dust-like consistency and is non-toxic.

The nitrogen burner includes a combustion chamber, a supply line for the silicon hydride compounds leading into the combustion chamber and a supply line for compressed air supplying the nitrogen for the combustion of the silicon hydride compounds and the oxygen for the combustion of the hydrogen of the silicon hydride compounds. The air supply line leads to at least one air inlet opening at the outer casing of the aerodyne, wherein corresponding compression means are arranged therebetween. Preferably, the supply line for the silicon hydride compounds is connected to a source of silane oils which are carried along as fuel in a corresponding storage room of the aerodyne. The silane oils are liquid and adapted to be pumped.

Preferably, the combustion chamber is formed in such a manner that the compressed air is annularly introduced into the combustion chamber while the silane oil is introduced into the combustion chamber approximately centrally. Preferably, the fuel supply for the combustion chamber is realized automatically in response to the pressure and the temperature of the combustion chamber.

The casing of the combustion chamber is designed for correspondingly high pressures and temperatures. Appropriately, it includes a cooling jacket. The inner chamber can be protected by a ceramic or noble metal lining. Furthermore, the casing of the combustion chamber can preferably consist at least partly of titanium.

If not enough $O_2$ (from the air) is present for the combustion in order to burn all the H atoms of the silicon hydride compounds and to reach a sufficiently high temperature for the cracking of the $N_2$ molecule, additional oxygen has to be introduced into the combustion chamber, preferably, as nitric oxide. The additional oxygen has the effect of an "ignition medium" for the following N reaction.

The rocket drive used in the inventive aerodyne presents a mixture of a jet and of a known liquid rocket drive. According to the invention the advantages of both known systems are combined with one another. The inventive engine operates according to the repulsion principle, i.e. is comparable with a rocket engine and utilizes the high efficiency of the same, however, uses the nitrogen present in the atmosphere for the combustion of the silicon hydride compounds so that no specific oxidizing agent has to be carried along within the aerodyne. Furthermore, compared with a conventional jet engine it has the advantage that no mechanical elements in the combustion chamber are necessary.

Appropriately, the at least one rocket engine is disposed in the bottom area of the discus-shaped outer casing of the aerodyne. Preferably, it is adapted to be swung out from the bottom portion of the outer casing so that it is oriented laterally obliquely in order to enable a propulsion of the aerodyne in horizontal direction. Furthermore, the aerodyne has at least one air inlet opening preferably in the bottom aera of the discus-shaped outer casing. From there the air, if necessary after relaxation, is introduced into the combustion chamber of the rocket engine through compression means. Preferably, the air inlet opening is formed as air box adapted to be swung out from the bottom area and operating laterally obliquely.

The aerodyne operates in such a manner that it starts and lands by means of jet arrangements (helicopter engine) disposed in the peripherial area of the aerodyne. After lifting-off it is laterally accelerated with the at least one rocket engine. From a velocity of about 300 km/h the turbine blade rings of the helicopter engine can be switched off since the discus-shaped aerodyne is borne by the atmosphere on account of its buoyancy. By acceleration with the rocket engine to about 5000 km/h the discus-shaped aerodyne gains height by itself, to an altitude of 50 km there is still enough air for the rocket engine at this velocity. This process can continue up to an altitude of at least 80 km at about 8000 km/h. Here, the air is so rare that the resistance of the air is very small. The aerodyne flies with this cruising speed through the beginning of space with a throttled rocket engine which, if necessary, can be supplied with energy-rich liquid nitrogen-oxygen compounds. At a certain point of time the rocket engine can be completely switched off since the high velocity is still sufficient for a long cruising distance inspite of the incipient retardation. The increase of retardation and the reinforced lower side of the aerodyne, preferably reinforced with ceramic, allow a landing manoeuvre as with starting with turbines turned on again.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
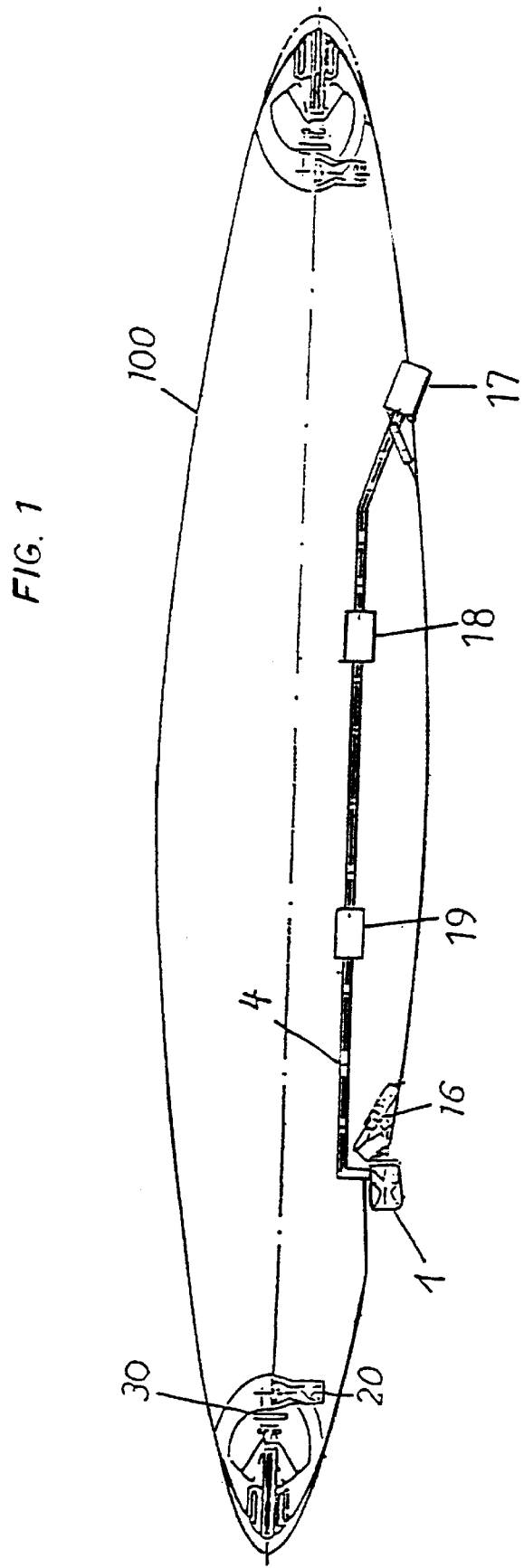
FIG. 1 is a diagrammatic elevational view of a discus-shaped aerodyne for extreme velocities.

The discus-shaped aerodyne 100 shown in FIG. 1 has, apart from its main drive means, substantially the same design as the aerodyne described in the above-cited German patent 42 15 835. Accordingly, details which are not contained in the present specification can be taken from the cited publication.

The aerodyne 100 shown in FIG. 1 has a discus-shaped outer casing which is formed in such a manner that buoyancy is generated when the discus-shaped vehicle travels obliquely through a gaseous medium.

In the peripheral region of the aerodyne a plurality of jets, preferably four, offset with respect to one another by 90°, respectively, are provided which, through corresponding transmissions 30, drive in opposite senses two rings guided along the whole periphery of the aerodyne. Angularly adjustable rotor blades are fastened on the rings. These rotor blades, as impellers, form two blade rings with which a downwardly directed air stream can be generated.

Further details with regard to the construction and the function of the jets can be taken from the above-cited German patent 42 15 835 and hence the jets need not be separately discussed here.

A rocket drive 1 is provided in the region of the lower surface of the discus-shaped aerodyne. This rocket drive is shown in detail in FIGS. 2 and 3. After the opening of a corresponding flap by means of a hydraulic cylinder 16, the rocket drive can be turned into a downwardly inclined position. This rocket drive is provided with a steerable suspension in order to enable the steering of the whole spacecraft. As occasion demands, a plurality of such rocket drives 1 can be provided on the lower surface of the aircraft.

Figure 2:
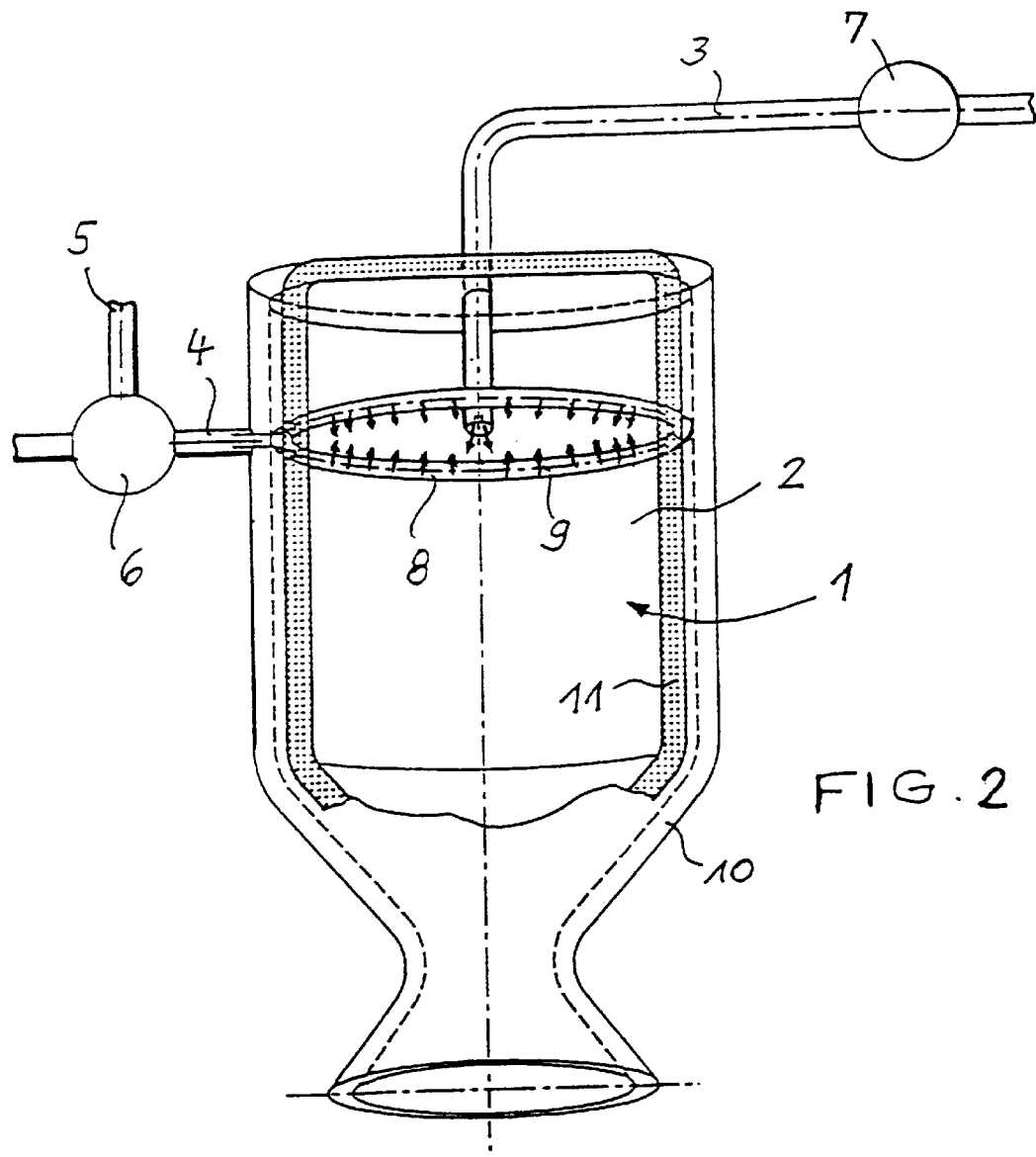
FIG. 2 is a diagrammatic cross section of a rocket engine of the aerodyne in an elevational view (broken away)
Figure 3:
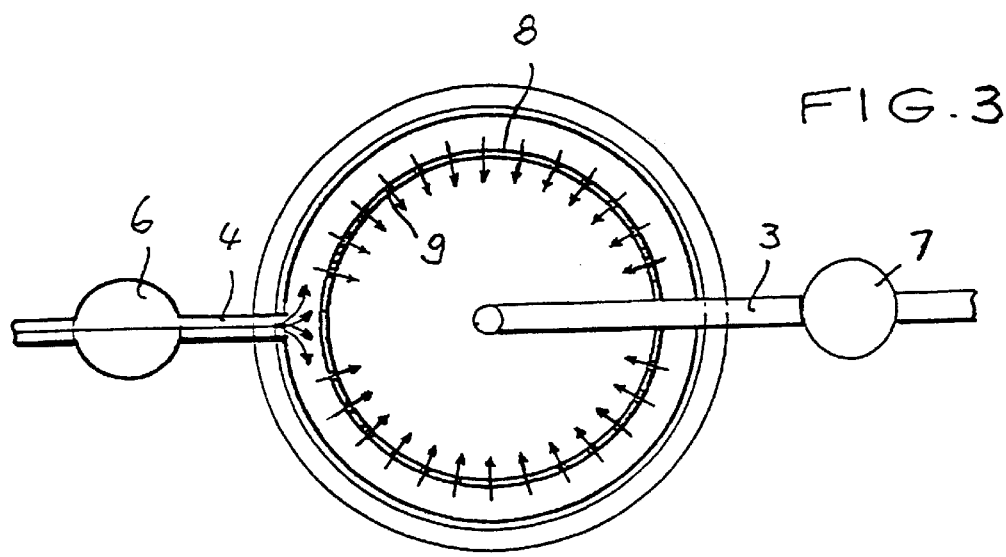
FIG. 3 is a horizontal section through FIG. 2.

The rocket drive 1 includes a combustion chamber 2 shown in FIGS. 2 and 3 which is supplied with silane oils as fuel and with compressed air for burning the fuel. The supply of air is schematicly indicated in FIG. 1. A supply line 4 opens into the combustion chamber 2 of the rocket drive. The air is taken from the atmosphere surrounding the aerodyne by means of an air inlet opening, here shown as an air capturing box 17 which is provided at the lower side of the aerodyne in a tiltable manner. The tilting of the air capturing box 17 is realized by means of a suitable hydraulic cylinder. From here the inflowing air is fed through the line 4 into an air relaxation means 18 and from there into a compression means 19. Both of these means are only schematically indicated. The strongly compressed air is fed from the compression means 19 into the combustion chamber 2 of the rocket drive.

The exact design of the rocket drive is shown in FIGS. 2 and 3. Here, the rocket drive is shown in a vertical position. Normally, it has a horizontal or inclined position at the lower side of the aerodyne.

The rocket drive includes a combustion chamber 2 the casing 11 of which consists of a suitable high temperature-resistent material, for instance metal or ceramics. Preferably, the casing consists at least partly of titanium. It is surrounded by a suitable cooling jacket 10.

Moreover, the combustion chamber is formed as the combustion chamber of a known rocket drive and has at its lower end in the figure an outlet opening provided with a corresponding restriction for increasing the velocity of the combustion gases.

The supply line 4 for the compressed air, which is compressed by the compressor schematicly shown at 6, opens into the combustion chamber. The supply line 4 feeds the compressed air into a ring 8 disposed within the combustion chamber and provided with a plurality of inwardly directed nozzle outlet openings 9 by means of which the compressed air is introduced into the interior of the combustion chamber. Furthermore, a supply line 3 for silane oils, which are introduced into the combustion chamber by means of a pump 7, opens into the combustion chamber into the interior of the ring 8. The introduction can be realized by suitable injection means (not shown).

The oxygen portion of the compressed air reacts with the hydrogen of the silane chain for the formation of $H_2O$. With the corresponding hydrogen-oxygen combustion sufficiently high temperatures are reached to crack the $N_2$ molecule. Now, the free nitrogen radicals attack the free silicon atoms whereby the desired combustion with nitrogen is generated. $Si_3N_4$ is formed. If sufficient air is not present, additional nitrogen-oxygen compounds, as for instance $NO_2$ or $HNO_3$, can be supplied to the combustion chamber, as schematically shown by the line 5.

Tetrafluorohydrazine is another preferred compound which supplies not only the required nitrogen but also the required oxidizing agent, namely fluorine.

FIG. 3 shows a horizontal section through the combustion chamber of FIG. 2.

The inventive aerodyne operates in the following manner:

With the aerodyne being in the rest position on foot rests which are not shown, at first the jets 20 are operated. Through the transmissions 30 the two rings with the corresponding blade rings are thereby oppositely rotated, whereby a downwardly directed air stream is generated. In this manner the aerodyne is lifted off the ground in the manner of a helicopter.

While the spacecraft is soaring over the ground the rocket drive 1 excentrically arranged in the bottom area of the outer casing of the aerodyne is turned into the position shown in FIG. 1 by means of the hydraulic cylinder 16 and is taken into operation. The aerodyne is laterally accelerated by means of this rocket drive. Still before reaching sonic speed the rotor blades of the blade rings can be positioned horizontally since now the aerodynamic shape of the outer casing 1 supplies the necessary buoyancy with increasing velocity. The jets 20 are switched off at a velocity of about 1000 km/h and a flight height of about 5 km. The afterrunning of the blade rings stabilizes the aerodyne.

Now, the aerodyne can be accelerated to a velocity of about 6000 km/h by means of the rocket drive 15. The atmospheric pressure substantially exponentially decreasing with increasing flight height is compensated by the increasingly higher velocity of the aerodyne so that a flight height of about 50 km can be reached in this manner by oblique flight.

For the landing of the aerodyne the rocket drive 1 is switched off and tilted back. Also the corresponding air boxes are tilted back. Then, the jets 20 are switched on again so that the aerodyne can carry out a smooth downward movement in vertical direction.

Accordingly, long-distance flights in great altitudes (at least 80 km) with great velocities (about 8000 km/h) can be carried out with the inventive aerodyne. In this area the air is so rare that the air resistance is extremely low. However, still enough air is present for the required combustion. In this area the aerodyne can fly through the beginning of space with throttled rocket engines which, if necessary, are supplied with energy-rich liquid nitrogen-oxygen compounds. At a certain point of time the rocket engines can be completely switched off since the high velocity is still sufficient for a long cruising distance in spite of the later beginning retardation. The increasing retardation against the lower side of the aerodyne which is armored with ceramics allows a landing manoeuvre with the turbines switched on again.

Accordingly, very high velocities with very high altitudes can be reached wherein, the aircraft can travel without any drive by utilization a sailing effect. A point landing is possible because of the turbine drive so that the aerodyne has a very large range of application.

We claim:

1. A discus-shaped aerodyne for extremely high velocities and extreme altitudes comprising:

a discus-shaped outer casing configured to generate buoyancy upon horizontal travel through a gas atmosphere;

a jet arrangement disposed along a peripheral area of the casing for the generation of lift;

at least one rocket drive on said casing for reaction of silicon hydride compounds for the generation of horizontal movement of the aerodyne and including a nitrogen burner in which the silicon hydride compounds are burned with atmospheric nitrogen at increased temperatures in the presence of atmospheric oxygen as an oxidizing agent for hydrogen of the silicon hydride compounds; and means for feeding said silicon hydride compounds and atmospheric air to said burner.

2. The aerodyne according to claim 1 wherein the rocket drive burns silane oils.

3. The aerodyne according to claim 2 wherein said means for feeding supplies silane oils of the chemical formula $Si_5H_{12}$ to $Si_9H_{20}$ to said burner.

4. The aerodyne according to claim 1, further comprising means for feeding to the rocket drive nitrogen compounds for the combustion in addition to atmospheric nitrogen.

5. The aerodyne according to claim 1 wherein the rocket drive includes a combustion chamber, a supply line for the silicon hydride compounds leading into the combustion chamber, and a supply line for the atmospheric nitrogen and the atmospheric oxygen leading into the combustion chamber.

6. The aerodyne according to claim 5 wherein the supply line for the atmospheric nitrogen and the atmospheric oxygen is connected to a source of compressed air.

7. The aerodyne according to claim 5, further comprising means for introducing the compressed air annularly into the combustion chamber.

8. The aerodyne according to claim 5, further comprising a cooling jacket for said combustion chamber.

9. The aerodyne according to claim 8 wherein said combustion chamber has a casing consisting at least partially of titanium.

10. The aerodyne according to claim 5, further comprising means for controlling introduction of the silicon hydride compounds, the compressed air and nitrogen compounds into the combustion chamber automatically in response to the pressure and the temperature of the combustion chamber.

11. The aerodyne according to claim 5 wherein said rocket drive is disposed in a bottom region of the discus-shaped casing.

12. The aerodyne according to claim 11, further comprising means for mounting said rocket drive to be swung out from the bottom area of the outer casing so that said rocket drive acts laterally obliquely.

13. The aerodyne according to claim 12, further comprising at least one air inlet opening in the bottom area of the discus-shaped outer casing.

14. The aerodyne according to claim 13 wherein the air inlet opening is formed as an air box adapted to be swung out from the bottom area and acting laterally obliquely.

* * * * *